United States Patent
Jinno et al.

(10) Patent No.: US 8,065,069 B2
(45) Date of Patent: Nov. 22, 2011

(54) VEHICLE AND CONTROL METHOD THEREOF

(75) Inventors: Kunihiko Jinno, Toyota (JP); Tadashi Nakagawa, Aichi-ken (JP); Masahiko Maeda, Nagoya (JP); Hideaki Yaguchi, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 380 days.

(21) Appl. No.: 12/522,234

(22) PCT Filed: Oct. 25, 2007

(86) PCT No.: PCT/JP2007/070821
§ 371 (c)(1),
(2), (4) Date: Jul. 6, 2009

(87) PCT Pub. No.: WO2008/084587
PCT Pub. Date: Jul. 17, 2008

(65) Prior Publication Data
US 2010/0076663 A1    Mar. 25, 2010

(30) Foreign Application Priority Data
Jan. 12, 2007 (JP) .................................. 2007-004453

(51) Int. Cl.
*B60W 10/06* (2006.01)
(52) U.S. Cl. ................. 701/102; 180/65.28; 123/179.4; 123/339.16; 123/339.22; 123/339.24
(58) Field of Classification Search ................. 701/102; 180/65.21, 65.28; 123/179.4, 339.16–339.18, 123/339.22, 339.24
See application file for complete search history.

(56) References Cited

U.S. PATENT DOCUMENTS

| | | | |
|---|---|---|---|
| 6,283,086 B1 | 9/2001 | Yamamoto et al. | |
| 6,543,431 B2* | 4/2003 | Surnilla et al. | 123/685 |
| 7,317,985 B2* | 1/2008 | Suzuki | 701/113 |
| 7,631,710 B2* | 12/2009 | Utsumi | 180/65.21 |
| 7,657,362 B2* | 2/2010 | Ando et al. | 701/106 |
| 7,672,762 B2* | 3/2010 | Matsubara | 701/22 |
| 7,698,045 B2* | 4/2010 | Jinno | 701/102 |
| 2003/0154952 A1 | 8/2003 | Osawa | |
| 2007/0149349 A1* | 6/2007 | Utsumi et al. | 477/3 |
| 2007/0220883 A1 | 9/2007 | Harada et al. | |
| 2009/0058326 A1* | 3/2009 | Oyobe et al. | 318/53 |

FOREIGN PATENT DOCUMENTS

| | | |
|---|---|---|
| JP | 2001-107769 A | 4/2001 |
| JP | 2003-239782 A | 8/2003 |
| JP | 2005-337173 A | 12/2005 |
| JP | 2006-151039 A | 6/2006 |

* cited by examiner

*Primary Examiner* — Erick Solis
(74) *Attorney, Agent, or Firm* — Sughrue Mion, PLLC

(57) ABSTRACT

In a hybrid vehicle 20, when an ECO switch 88 is turned off while an intermittent operation of an engine 22 is prohibited in response to a warm-up demand of the engine 22 according to a cooling water temperature Tw or a heating demand, the engine 22 is autonomously operated at a target rotational speed Ne* derived and set from a normal autonomous rotational speed setting map (Steps 170, S190). When the ECO switch 88 is turned on while the warm-up is demanded, the engine 22 is autonomously operated at the target rotational speed Ne* set based on an ECO mode autonomous rotational speed setting map so as to be not more than the value derived from the normal autonomous rotational speed setting map (Steps 180, S190).

7 Claims, 7 Drawing Sheets

VEHICLE AND CONTROL METHOD THEREOF

TECHNICAL FIELD

The present invention relates to a vehicle including an internal combustion engine capable of performing an intermittent operation and a control method thereof.

BACKGROUND ART

Conventionally, there is well-known a hybrid vehicle including an engine capable of performing an intermittent operation and an ECO switch for instructing to give priority to fuel consumption of the vehicle even if a heating function drops to some extent (for example, refer to Patent Document 1). When both the ECO switch and a heater switch for instructing to heat a vehicle room are turned on, the hybrid vehicle determines whether or not the intermittent operation of the engine is permitted based on an intermittent operation determination map having a tendency to permit the intermittent operation in comparison with that of the turn-off condition of the ECO switch so as to improve energy efficiency of the vehicle while ensuring certain heating performance. Also, there is known a hybrid vehicle having a normal mode and an energy saving mode as operation modes and reducing a fuel feed amount to the engine under the energy saving mode in comparison with the normal mode (for example, refer to Patent Document 2).
[Patent Document 1] Japanese Patent Laid-Open No. 2005-337173
[Patent Document 2] Japanese Patent Laid-Open No. 2006-151039

DISCLOSURE OF THE INVENTION

However, if the intermittent operation is permitted according to the turn-on of the ECO switch when the intermittent operation is to be prohibited due to the warm-up demand of the engine or the heating demanded, the fuel consumption may be improve, however, the warm-up of the engine or the heating of the vehicle room may not be satisfactorily performed due to an operation stop of the engine. Accordingly, the engine must be appropriately controlled upon the warm-up demand of the engine or the heating demanded so as to improve fuel consumption while ensuring warm-up performance or heating performance.

The present invention has an object to appropriately control an internal combustion engine so as to improve fuel consumption when a load operation is not demanded of the internal combustion engine and an intermittent operation of the internal combustion engine is prohibited.

The present invention accomplishes the demand mentioned above by the following configurations applied to a vehicle and a control method thereof.

A vehicle according to the present invention is a vehicle including an internal combustion engine capable of outputting power for driving and performing an intermittent operation, the vehicle including: a fuel consumption priority mode selection switch to select a fuel consumption priority mode that gives priority to fuel consumption; an intermittent permission determining module that determines whether or not the intermittent operation of the internal combustion engine is permitted; and an intermittent prohibition control module configured to control the internal combustion engine so as to autonomously operate at a first autonomous rotational speed when the fuel consumption priority mode selection switch is turned off during an intermittent operation prohibition in which a load operation is not demanded of the internal combustion engine and the intermittent operation of the internal combustion engine is prohibited by the intermittent permission determining module, the control module controlling the internal combustion engine so as to autonomously operate at a second autonomous rotational speed defined by giving priority to fuel consumption in comparison with the first autonomous rotational speed when the fuel consumption priority mode selection switch is turned on during the intermittent operation prohibition.

In the vehicle, the internal combustion engine is controlled so as to autonomously operate at the first autonomous rotational speed when the fuel consumption priority mode selection switch is turned off during the intermittent operation prohibition in which the load operation is not demanded of the internal combustion engine and the intermittent operation of the internal combustion engine is prohibited. When the fuel consumption priority mode selection switch is turned on during the intermittent operation prohibition, the internal combustion engine is controlled so as to autonomously operate at the second autonomous rotational speed defined by giving priority to fuel consumption in comparison with the first autonomous rotational speed. Thus, even if the load operation is not demanded of the internal combustion engine and the intermittent operation of the internal combustion engine is prohibited, it is possible to appropriately control the internal combustion engine so as to improve fuel consumption without an operation stop of the internal combustion engine by turning on the fuel consumption priority mode selection switch.

The second autonomous rotational speed may be defined to be not more than the first autonomous rotational speed. Thus, when the fuel consumption priority mode selection switch is turned on, a reduction of the autonomous rotational speed slightly causes vibration and noise, however, fuel consumption of the internal combustion engine can be improved.

The intermittent operation prohibition may includes a time when a warm-up of the internal combustion engine is necessary and a time when a heating is demanded of a heater that heats a vehicle room through the use of the internal combustion engine as a heat source.

The above vehicle may further include a motor capable of outputting power for driving, and an accumulator capable of supplying and receiving electric power from the motor. The above vehicle may further include a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. In this case, the power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, and the motor may be capable of outputting power to the predetermined axle or another axle different from the predetermined axle. The electric power-mechanical power input output structure may include a generator capable of inputting and outputting power, and a three shaft-type power input output assembly connected with three shafts, the predetermined axle, the engine shaft of the internal combustion engine, and a rotating shaft of the generator, the three shaft-type power input output assembly configured to input and output power to one remaining shaft, based on input and output of powers from and to any two shafts selected among the three shafts. Further, the power transmitting mechanism may be a continuously variable transmission.

A control method of a vehicle according to the present invention is a control method of a vehicle including an internal combustion engine capable of outputting power for driving and performing an intermittent operation and a fuel consumption priority mode selection switch to select a fuel consumption priority mode that gives priority to fuel consumption, the method including the steps of:

(a) determining whether or not the intermittent operation of the internal combustion engine is permitted; and
(b) controlling the internal combustion engine so as to autonomously operate at a first autonomous rotational speed when the fuel consumption priority mode selection switch is turned off during an intermittent operation prohibition in which a load operation is not demanded of the internal combustion engine and the intermittent operation of the internal combustion engine is prohibited at the step (a), the step (b) controlling the internal combustion engine so as to autonomously operate at a second autonomous rotational speed defined by giving priority to fuel consumption in comparison with the first autonomous rotational speed when the fuel consumption priority mode selection switch is turned on during the intermittent operation prohibition.

According to the method, even if the load operation is not demanded of the internal combustion engine and the intermittent operation of the internal combustion engine is prohibited, it is possible to appropriately control the internal combustion engine so as to improve fuel consumption without an operation stop of the internal combustion engine by turning on the fuel consumption priority mode selection switch.

In the method, the second autonomous rotational speed may be defined to be not more than the first autonomous rotational speed. Also, in the method, the intermittent operation prohibition may include a time when a warm-up of the internal combustion engine is necessary and a time when a heating is demanded of a heater that heats a vehicle room through the use of the internal combustion engine as a heat source.

BEST MODES OF CARRYING OUT THE INVENTION

Now, the best mode for carrying out the present invention will be described with reference to an embodiment.

Figure 1:
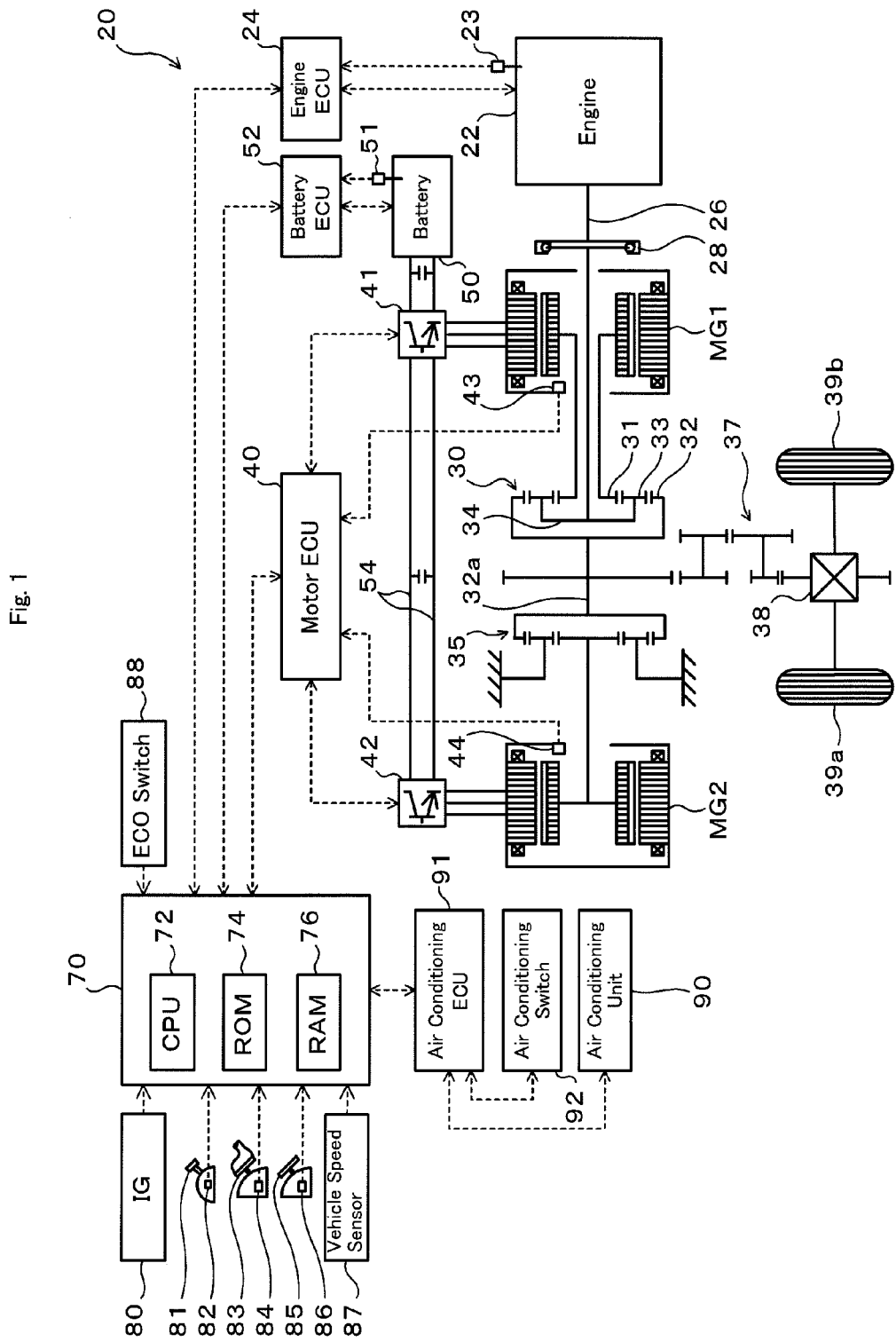
FIG. 1 is a schematic block diagram of a hybrid vehicle 20 according one embodiment of the present invention.

FIG. 1 schematically illustrates the configuration of a hybrid vehicle 20 in one embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, an air conditioning unit 90 for air-conditioning (cooling and heating) a vehicle room (not shown), and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU") . The engine ECU 24 inputs diverse signals from various sensors mounted on the engine 22 to measure and detect the operating conditions of the engine 22, such as a cooling water temperature sensor 23 that detects a temperature of a cooling water for cooling the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32*a* through a gear mechanism 37 and a differential gear 38 and is eventually output to drive wheels 39*a* and 39*b* of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42.

The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The air conditioning unit 90 includes a heat exchanger included in a cooling system of the engine 22 and enabling a heat exchange between the cooling water and air, a blower sucking outside air and inside air of the vehicle into the heat exchanger side and discharging conditioned air that is air exchanging heat with the cooling water in the heat exchanger into the vehicle room, a three way valve allowing one of the outside air and the inside air to be sucked by the blower, a refrigeration cycle, an air conditioning electronic control unit 91 for controlling whole of the unit (hereinafter referred to as "air conditioning ECU") and the like. The air conditioning ECU 91 inputs an air conditioning on/off signal and a setting temperature signal from an air conditioning switch 92 mounted on an instrument panel or the like in the vehicle room, a room temperature, an outside air temperature, an amount of solar radiation from sensors that are not shown in drawings. The air conditioning ECU 91 drives and controls the blower and the like based on these input signals so that the room temperature becomes the setting temperature. Also, the air conditioning ECU 91 sets a predetermined heating demand flag to value "1" when determining that the vehicle room is to be heated in accordance with input signals from the air conditioning switch 92 and the like. The heating demand flag is set to value "0" when the heating is not demanded. The air conditioning ECU 91 establishes communication with the hybrid ECU 70 to output an engine operation demand and data regarding conditions of the air conditioning unit 90 if necessary.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (fuel consumption priority mode selection switch) 88 to select, as a control mode at a time of driving, an ECO mode (fuel consumption priority mode) that gives priority to fuel consumption over drivability is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, the air conditioning ECU 91, and the like, and exchanges various control signals and data with the engine ECU 24, the motor ECU 40, the battery ECU 52, the air conditioning ECU 91, and the like. In the embodiment, the hybrid vehicle 20 includes, as shift positions of the shift lever 81, a parking position (P position) used at parking, a reverse position (R position) for reverse driving, a neutral position (N position), a drive position (D position) for forward driving, and a brake position (B position) that is mostly selected during downhill driving at relative high speed.

The hybrid vehicle 20 of the embodiment constructed as described above sets a torque demand, which is to be output to the ring gear shaft 32*a* or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32*a*. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation.

Figure 2:
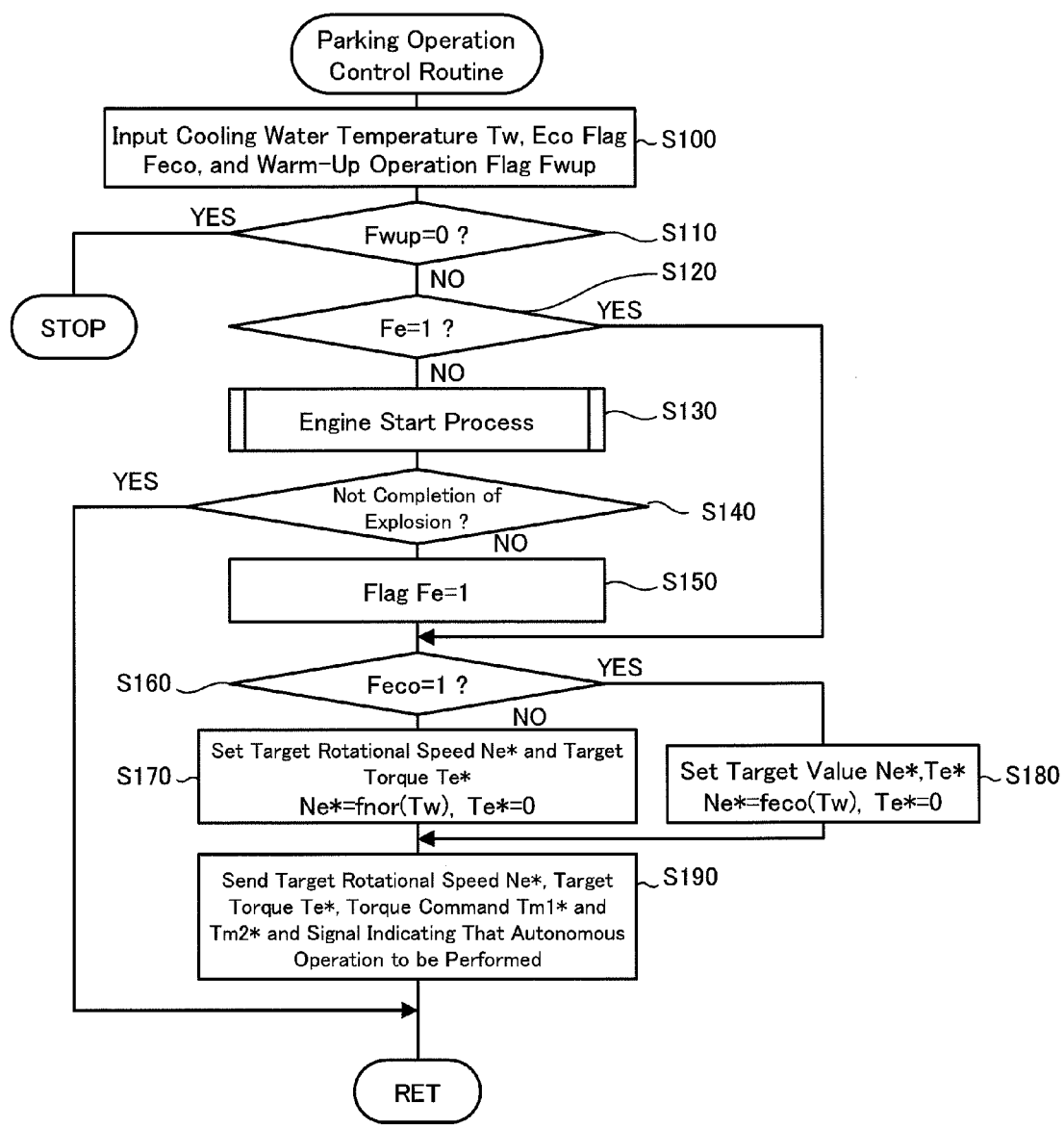
FIG. 2 is a flowchart illustrating an example of a parking operation control routine executed by a hybrid electric control unit 70 in the embodiment.

Next, an operation control procedure at parking of the hybrid vehicle 20 with the above configuration will be described. FIG. 2 is a flowchart illustrating an example of a parking operation control routine that is executed by the hybrid ECU 70 at predetermined time intervals (for example, at every several msec) while the shift position SP is set to the P position and the hybrid vehicle 20 is parked after start-up of the system.

Figure 3:
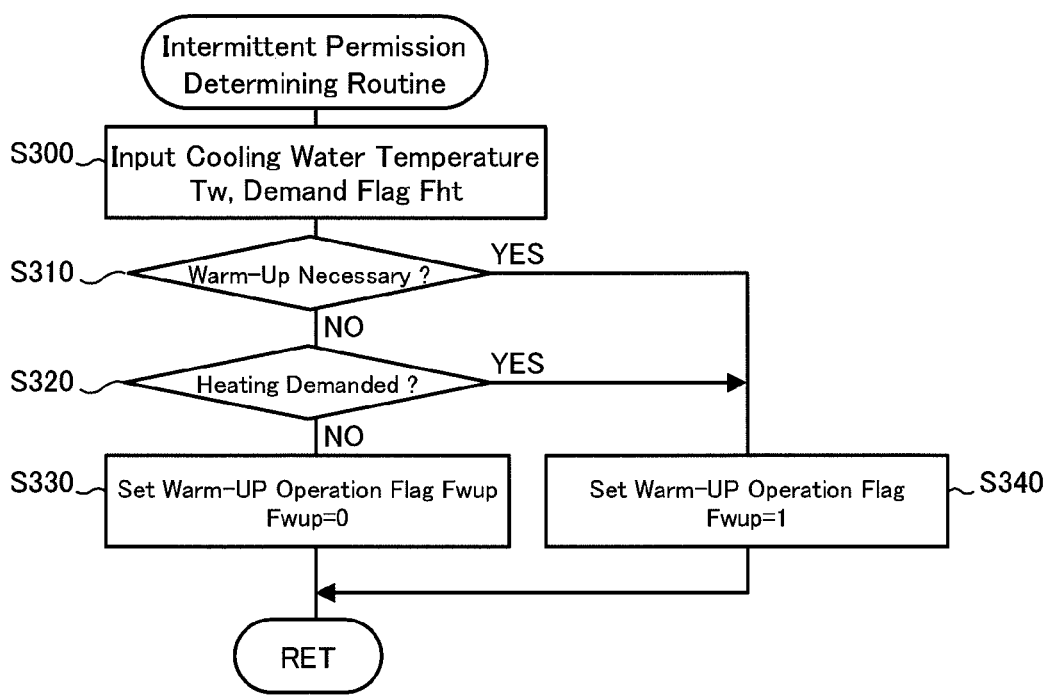
FIG. 3 is a flowchart illustrating an example of an intermittent permission determining routine executed by the hybrid electric control unit 70 in the embodiment.

At start of the parking operation control routine in FIG. 2, the CPU 72 of the hybrid ECU 70 executes input processing of data required for control such as the cooling water temperature Tw, a value of the ECO flag Feco, and a value of a predetermined warm-up operation flag Fwup (Step S100). The cooling water temperature Tw detected by the cooling water temperature sensor 23 is input from the engine ECU24. The warm-up flag Fwup is set by an intermittent permission determining routine in FIG. 3 executed by the hybrid EUC70 in the embodiment and stored in a predetermined storage area. Here, the description of the parking operation control routine is suspended and the intermittent permission determining routine will be described. The intermittent permission determining routine shown in FIG. 3 is also executed by the hybrid ECU 70 at predetermined time intervals while the shift position SP is set to the P position and the hybrid vehicle 20 is parked after start-up of the system. At start of the routine, the CPU 72 of the hybrid ECU 70 executes input processing of data required for control such as the cooling water temperature Tw, and a value of a warm-up demand flag Fht from the air conditioning ECU 91 (Step S300). Then, the CPU 72 determines whether a warm-up operation of the engine 22 without load (no-load operation) is necessary or not (Step S310) in accordance with the cooling water temperature Tw. When determining that the warm-up operation is necessary, the CPU 72 sets the warm-up operation flag Fwup to value "1" (Step S340). When determining that the warm-up operation is not necessary in accordance with the cooling water temperature Tw, the CPU 72 checks a value of the warm-up demand flag Fht input at Step S300 (Step S320). When the warm-up demand flag Fht is value "1" and the heating is demanded, the CPU 72 sets the warm-up operation flag Fwup to value "1" so as to ensure a heat source from heating by the warm-up operation of the engine 22 without load (Step S340). When negative determinations are made at both Steps S310 and S320, the CPU 72 sets the warm-up operation flag Fwup to value "0" (Step S330) because it is considered that the warm-up operation of the engine 22 is not necessary in accordance with the cooling water temperature Tw or the heating demand. Once the warm-up operation flag is set to value "1" as described above, an intermittent operation of the engine or an operation stop of the engine 22 is prohibited.

Figure 4:
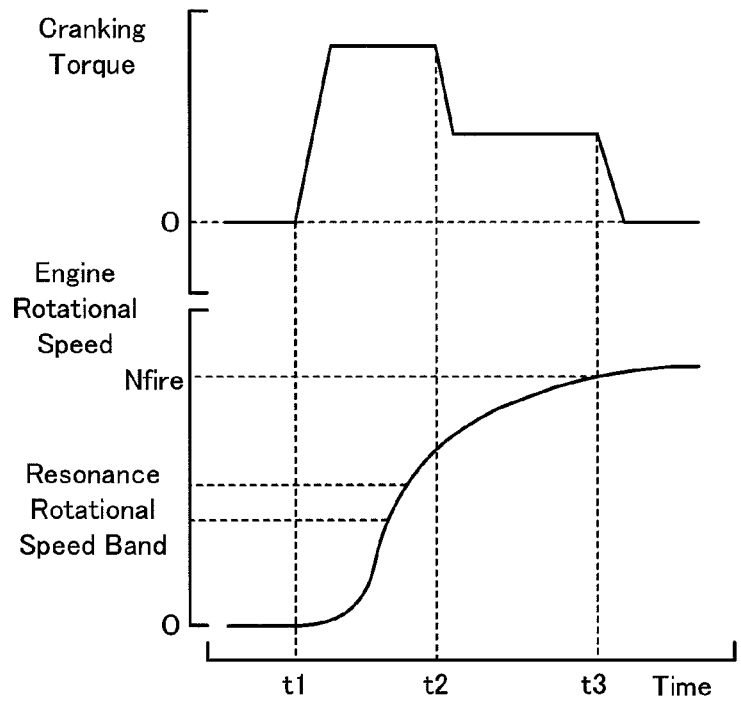
FIG. 4 is a view illustrating an example of a cranking torque setting map.

The parking operation control routine in FIG. 2 will be described again. After the data input at Step S100, the CPU 72 determines whether or not the input warm-up operation flag Fwup is value "0", that is, whether or not the warm-up operation is demanded in accordance with the cooling water temperature Tw or the warm-up demand (Step S110). When the warm-up operation flag Fwup is value "1" and the warm-up operation is demanded, the CPU 72 determines whether or not a flag Fe is value "1" (Step S120). The flag Fe is set to value "1" when a start of the engine 22 is completed (an explosion of the engine 22 is completed). When the flag Fe is value "0", the CPU 72 starts an engine start process (Step S130). While the engine start process, the CPU 72 inputs a rotational speed Ne of the engine 22 and rotational speeds Nm1 and Nm2 of the motors MG1 and MG2, and sets a cranking torque as a torque command for the motor MG1 based on the input rotational speed Ne of the engine 22 and an elapsed time counted by a timer (not shown) from a start of a cranking of the engine 22 as shown in FIG. 4. The CPU 72 sets a torque command for the motor MG2 so that the motor MG2 outputs torque for cancelling torque acting on the ring gear shaft 32a as the axle during the cranking of the engine 22 by the motor MG1. In the embodiment, as seen from FIG. 4, relative large torque is set as the cranking torque based on a rate processing just after a start time t1 of the cranking in order to promptly increase the rotational speed Ne of the engine 22. At a time t2 when the rotational speed Ne of the engine 22 passes a resonance rotational speed band or a time required for passing the resonance rotational speed band is elapsed, the cranking torque is set to torque capable of stably cranking the engine 22 at rotational speed more than an ignition start rotational speed Nfire so as to decrease electric power consumption and a reaction force output to the ring gear shaft 32a as the axle by the motor MG1. Then, the CPU 72 sends control signals for starting a fuel injection control and an ignition control. From a time t3 when the rotational speed Ne reaches the ignition start rotational speed Nfire, the CPU 72 gradually decreases the cranking torque up to value "0" based on a rate processing. When the above engine start process of the Step S130 is executed once, the CPU 72 determines whether or not the explosion of the engine 22 is completed (Step S140). When the explosion of the engine 22 is not completed, the CPU 72 returns to Step S100 to repeat the processing of and after Step S100. When the explosion of the engine 22 is completed, the CPU 72 sets the flag Fe to value "1" (Step S150).

Figure 5:
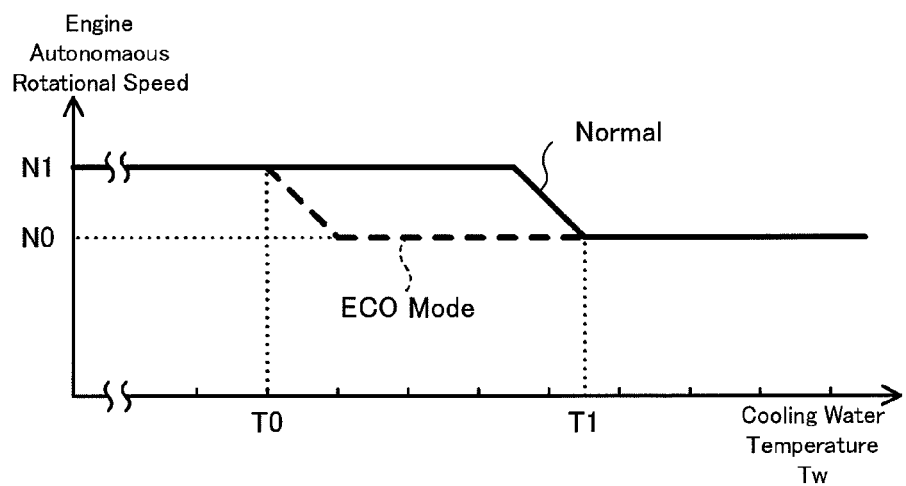
FIG. 5 is a view exemplifying a normal autonomous rotational speed setting map and an ECO mode autonomous rotational speed setting map.

After setting the flag Fe to value "1" according to the completion of the explosion of the engine 22, the CPU 72 determines whether or not a value of the ECO flag Feco input at Step S100 is value "1", that is, whether or not the ECO switch 88 is turned on (Step S160). When the ECO flag Feco is value "0" and the ECO switch is turned off, the CPU 72 sets an target rotational speed Ne* of the engine 22 based on the cooling water temperature Tw input at Step S100 and a normal autonomous rotational speed setting map shown in a solid line of FIG. 5, and sets a target torque Te* of the engine 22 to value "0" (Step S170). When the ECO flag Feco is value "1" and the ECO switch is turned on, the CPU 72 sets an target rotational speed Ne* of the engine 22 based on the cooling water temperature Tw input at Step S100 and an ECO mode autonomous rotational speed setting map shown in a broken line of FIG. 5, and sets a target torque Te* of the engine 22 to value "0" (Step S180). The normal autonomous rotational speed setting map and the ECO mode autonomous rotational speed setting map respectively define a relationship between the cooling water temperature Tw and an autonomous rotational speed for an autonomous operation of the engine 22 not to output torque substantially. In the embodiment, the normal autonomous rotational speed setting map is predetermined so as to sets the autonomous rotational speed of the engine 22 to a value N1 (for example, a value selected from 1100-1400 rpm) that is predetermined to reduce vibration and noise as much as possible and sufficiently ensure warm-up performance (heating performance) when the cooling water temperature Tw is lower than a predetermined temperature T1 (for example, a value selected from a range from 60 to 70 degree C.). The normal autonomous rotational speed setting map is also predetermined so as to sets the autonomous rotational speed to a value N0 (for example, a value selected from a range from 900 to 1000 rpm) that is smaller than the value N1 when the cooling water temperature Tw is equal to or higher than the predetermined temperature T1. The normal autonomous rotational speed setting map is stored in the ROM 74. In the embodiment, the ECO mode autonomous rotational speed setting map gives priority to fuel consumption of the engine 22 over the prevention of vibration and noise and the ensuring of the warm-up performance and the heating performance and is predetermined so as to sets the autonomous rotational speed to the value N0 smaller than the normal value N1 when the cooling water temperature Tw is higher than a predetermined temperature T0 (for example, a value selected from a range from 15 to 25 degree C.) lower than the value T1. The ECO mode autonomous rotational speed setting map is stored in the ROM 74. At Step S170 or S180, the autonomous rotational speed corresponding to the cooling water temperature Tw input at Step S100 is derived and set from the normal autonomous rotational speed setting map or the ECO mode autonomous rotational speed setting map. That is, the autonomous rotational speed is basically set to a value equal to or less than that of the turn-off condition of the ECO switch 88 when the ECO switch 88 is turned on and the ECO mode autonomous rotational speed setting map is used. When the cooling water temperature Tw is within a range from the value T0 to the value T1, the autonomous rotational speed is set to a value less than that of the turn-off condition of the ECO switch 88.

After setting the target rotational speed Ne* and the target torque Te* of the engine 22 at Step S170 or S180, the CPU 72 sends the target rotational speed Ne*, the target torque Te* and a signal indicating that the autonomous operation is to be performed to the engine ECU 24 (Step S190) and returns to Step S100 to repeat the processing of and after Step S100. When executing the processing of and after Step S100, the CPU 72 skips the engine start process and the like from Step S130 to 5150 according to a determination at Step S120 because the flag is set to value "1" at previous Step S150 and executes the processing of and after Step S160. When the warm-up operation flag Fwup is set to value "0" due to a completion of the warm-up of the engine 22 in the intermittent permission determining routine shown in FIG. 3 and a positive determination is made at Step S110, the CPU 72 terminates the parking operation control routine and determines whether or not the operation of the engine 22 is to be stopped according to a predetermined procedure. When the operation of the engine 22 is to be stopped, the CPU 72 executes a predetermined engine start routine (not shown).

As has been described above, in the hybrid vehicle 20, the engine 22 is controlled so as to autonomously operate at the target rotational speed Ne* (first autonomous rotational speed) derived and set from the normal autonomous rotational speed setting map (Steps S170 and S190) when the ECO switch 88 is turned off while the warm-up operation is demanded of the engine 22 in accordance with the cooling water temperature Tw or the heating demand and the intermittent operation of the engine 22 is prohibited. When the ECO switch 88 is turned on while the warm-up operation is demanded of the engine 22 in accordance with the cooling water temperature Tw or the heating demand and the intermittent operation of the engine 22 is prohibited, the engine 22 is controlled so as to autonomously operate at the target rotational speed Ne* (second autonomous rotational speed) derived and set from the ECO mode autonomous rotational speed setting map so as to be equal to or less than the value derived and set from the normal autonomous rotational speed setting map (Steps S180 and S190). Thus, when the warm-up operation is performed, that is, when a load operation is not demanded of the engine 22 and the intermittent operation of the engine 22 is prohibited, the reduction of the autonomous rotational speed slightly causes vibration and noise, however, it is possible to appropriately control the engine 22 so as to improve fuel consumption without the operation stop of the engine 22 by turning on the ECO switch 88. In the embodiment, the ECO mode autonomous rotational speed setting map is determined to set the autonomous rotational speed of the engine 22 to be equal to or less than the value derived from the normal autonomous rotational speed setting map, so that fuel consumption of the engine 22 can be improved when the ECO switch 88 is turned on.

When the driver sets the shift position to the D position and depresses the accelerator pedal 83 while the parking operation control routine shown in FIG. 2 is executed, the CPU 72 terminates the parking operation control routine and executes a drive control routine (not shown) for driving and controlling the engine 22, the motors MG1 and MG2 so that the hybrid vehicle 20 is driven with torque equivalent to a torque demand for driving (power demand for driving) set in accordance with the accelerator opening and the vehicle speed. At this time, in the above hybrid vehicle 20, it is possible to perform the autonomous operation (no-load operation) of the engine 22 while controlling the motor MG2 so as to output torque equivalent to the torque and discharge of the battery 50. Accordingly, in the hybrid vehicle 20 of the embodiment, the engine 20 can be autonomously operated so as continue the warm-up and the like if necessary when the vehicle starts to drive after the termination of the parking operation control routine in FIG. 2. Here, in the hybrid vehicle 20, fuel consumption can be improved by appropriately performing the intermittent operation of the engine 22 and controlling the motor MG2 so as to output power for driving. Further, when the vehicle speed is equal to or higher than a predetermined vehicle speed, the intermittent operation of the engine 22 is prohibited in order to satisfactorily ensure an acceleration performance. Then, the engine 22 is autonomously operated (operated without load) when the torque command is not more than a predetermined value for example. Upon setting the autonomous rotational speed is set in accordance with the vehicle speed and the torque command during the intermittent operation prohibition, the autonomous rotational speed may be reduced in comparison with the turn-off condition of the ECO switch 88 when the ECO switch is turned on. Thus, the reduction of the autonomous rotational speed slightly causes vibration and noise, however, fuel consumption can be improved.

Figure 6:
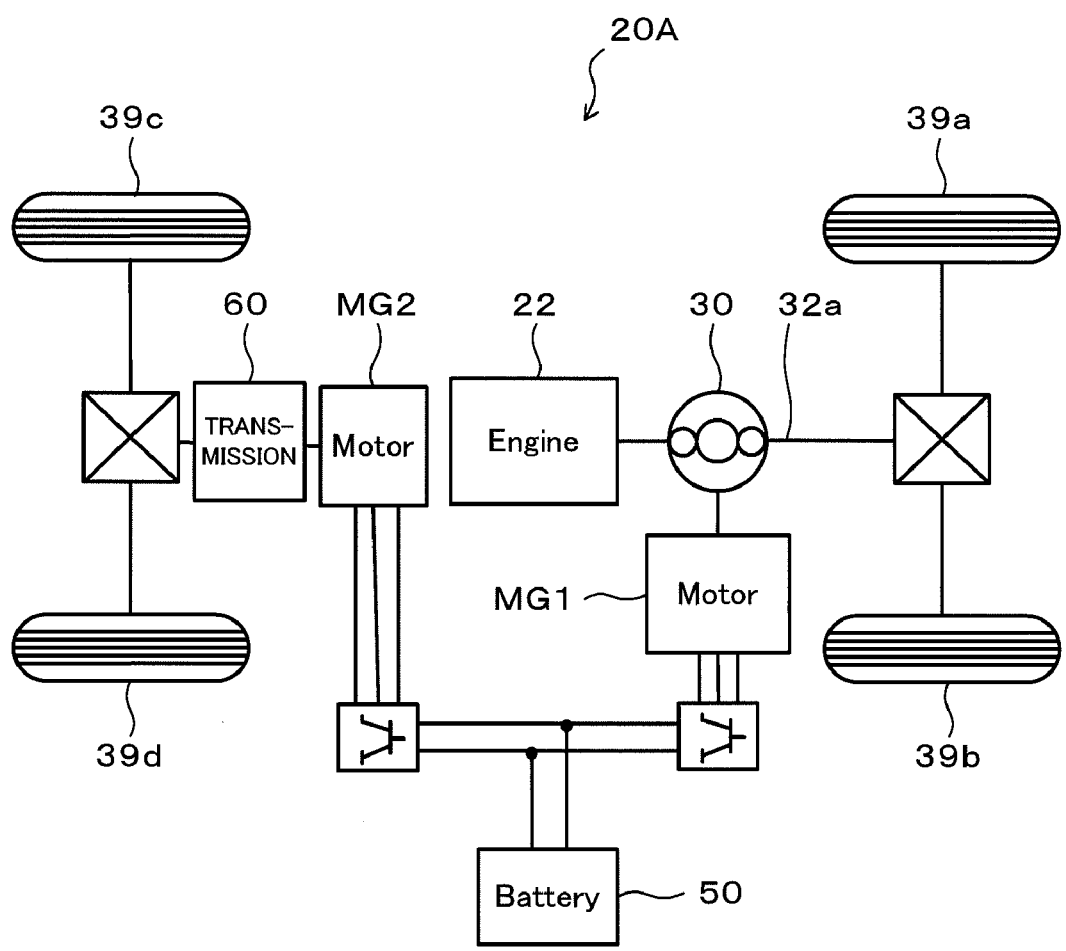
FIG. 6 is a schematic block diagram of a hybrid vehicle 20A according to a modification of the present invention.
Figure 7:
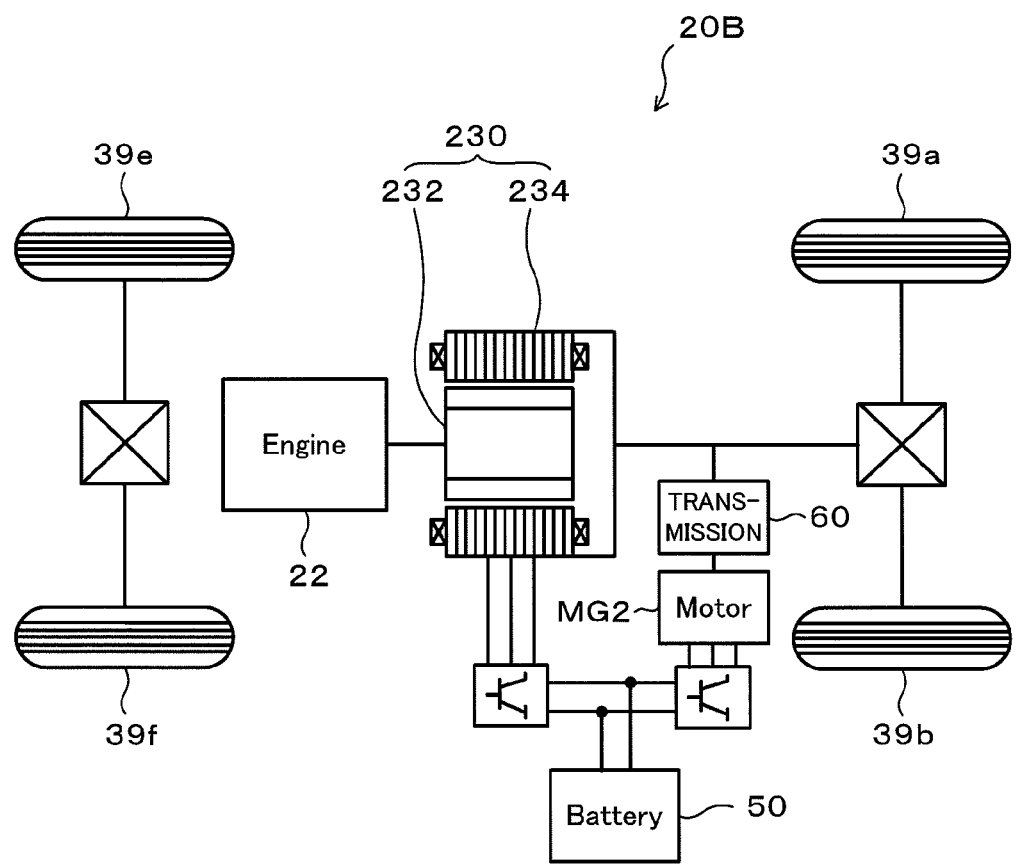
FIG. 7 is a schematic block diagram of a hybrid vehicle 20B according to a further modification of the present invention.

Although the hybrid vehicle 20 of the above described embodiment is a vehicle that outputs the power of the motor MG2 to an axle connected to the ring gear shaft 32a, an object for application of the present invention is not limited thereto. More specifically, as in the case of a hybrid vehicle 20A as a modification example shown in FIG. 6, the present invention may also be applied to a vehicle in which the power of the motor MG2 is output to an axle (axle connected to wheels 39*c* and 39*d* in FIG. 6) that is different from the axle (axle to which the wheels 39*a* and 39*b* are connected) that is connected to the ring gear shaft 32*a*. Further, although the hybrid vehicle 20 of the above described embodiment is a vehicle that outputs the power of the engine 22 to the ring gear shaft 32*a* as an axle connected to the wheels 39*a* and 39*b* via the power distribution and integration mechanism 30, an object for application of the present invention is not limited thereto. More specifically, as in the case of a hybrid vehicle 20B as a modification example shown in FIG. 7, the present invention may also be applied to a vehicle that includes a pair-rotor motor 230 that has an inner rotor 232 connected to the crankshaft of the engine 22, and an outer rotor 234 connected to the axle that outputs the power to the wheels 39*a* and 39*b* and that transmits a part of the power output from the engine 22 to the axle while converting the remainder of the power into electric power.

Figure 8:
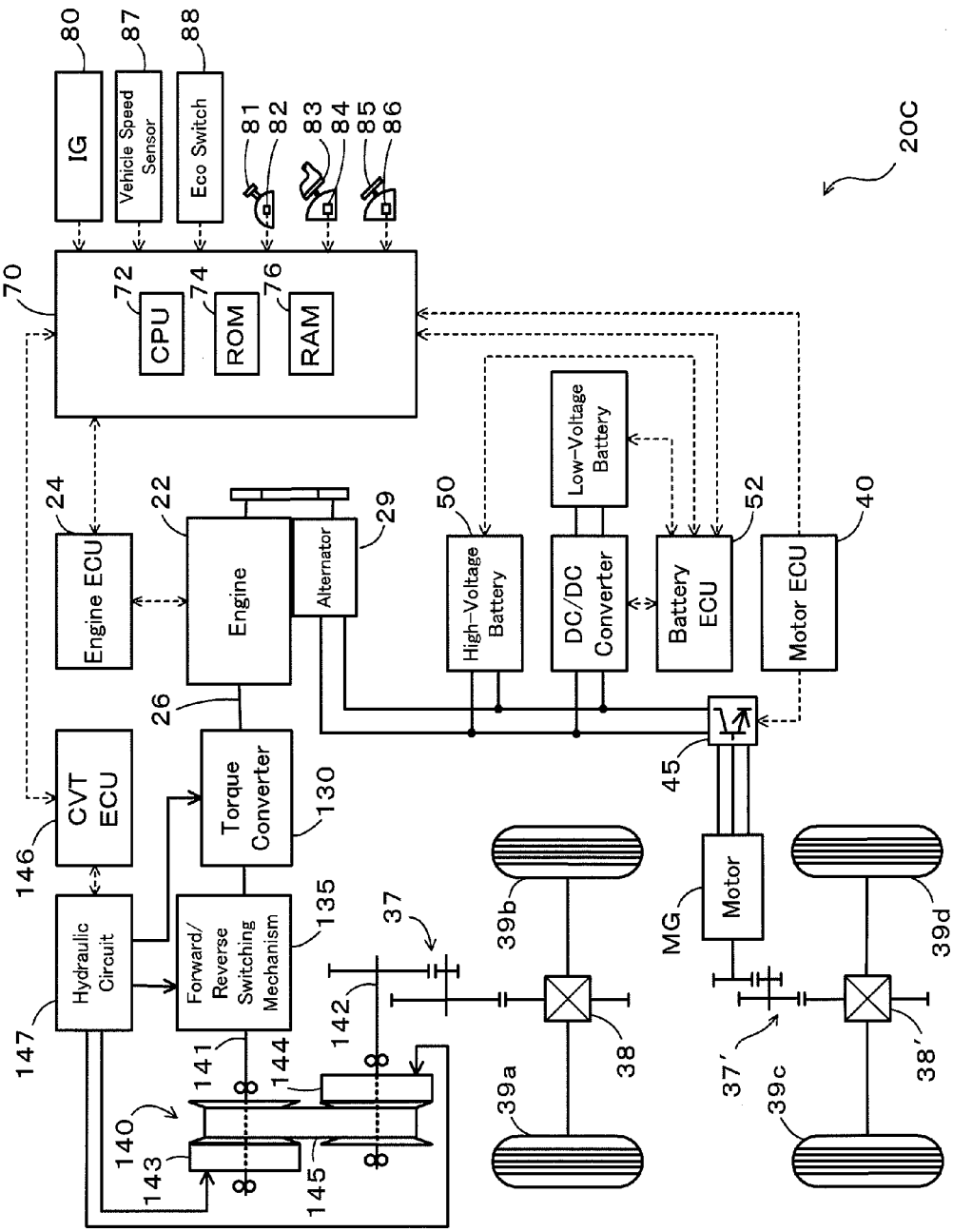
FIG. 8 is a schematic block diagram of a hybrid vehicle 20C according to a still further modification of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 20C that is one example of this kind of vehicle is illustrated in FIG. 8. The hybrid vehicle 20C as a modification example shown in FIG. 8 includes a front-wheel drive system that outputs the power from the engine 22 to, for example, wheels 39*a* and 39*b* that are front wheels via a torque converter 130, a forward/reverse switching mechanism 135, a belt-type CVT 140, a gear mechanism 37, a differential gear 38, and the like, a rear-wheel drive system that outputs power from a motor MG that is a synchronous motor generator to, for example, wheels 39*c* and 39*d* that are rear wheels via a gear mechanism 37', a differential gear 38' and the like, and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20C shown in FIG. 8 instead of the belt-type CVT 140. In the hybrid vehicle 20C constructed in this manner, when the ECO switch 88 is turned on while the load operation is not demanded of the engine 22 and the intermittent operation of the engine 22 is prohibited, the reduction of the autonomous rotational speed slightly causes vibration and noise, however, it allows to appropriately control the engine 22 so as to improve fuel consumption without the operation stop of the engine 22 by turning on the ECO switch 88.

Further, the present invention may also be applied to a vehicle that includes only the engine capable of performing the intermittent operation in addition to the hybrid vehicle including the motor, the generator and the like. For example, the present invention may be applied to a vehicle in which the engine is automatically stopped while disconnected from the axle side during deceleration.

The correlation between the principal elements of the embodiments and modification examples, and the principal elements of the invention described in the "Disclosure of the Invention" section will now be described. That is, in the above described embodiment and modification examples, the engine 22 corresponds to "internal combustion engine", the ECO switch 88 to select the ECO mode giving priority to fuel consumption corresponds to "fuel consumption priority mode selection switch", the hybrid ECU 70 executing the intermittent permission determining routine shown in FIG. 3 corresponds to "intermittent permission determining module" and the hybrid ECU 70 and the like executing the parking operation control routine shown in FIG. 2 corresponds to "control module for an intermittent prohibition". Further, the motors MG and MG2 correspond to "motor", the battery 50 corresponds to "accumulator", the power distribution integration mechanism 30 including the ring gear 32 as the axle-side rotational element and the carrier 34 as the engine-side rotational element, the CVT 140 including the input shaft 141 as the engine-side rotational element and the output shaft 142 as the axle-side rotational element, and the pair-rotor motor 230 including the inner rotor 232 connected to the engine 22 and the outer rotor 234 connected to the axle that outputs the power to the wheels 39*a* and 39*b* correspond to "power transmitting mechanism", a combination of the motor MG1 and the power distribution integration mechanism 30, and the pair-rotor motor 230 correspond to "electric power-mechanical power input output structure", the motor MG1, the alternator 29 and the pair-rotor motor 230 correspond to "motor for power generation", and the power distribution integration mechanism 30 corresponds to "three shaft-type power input output assembly". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of vehicles.

The invention claimed is:

1. A vehicle including an internal combustion engine capable of outputting power for driving and performing an intermittent operation, the vehicle comprising:

a fuel consumption priority mode selection switch to select a fuel consumption priority mode that gives priority to fuel consumption;

an intermittent permission determining module that prohibits the intermittent operation of internal combustion engine at least one of when a warm up of the internal combustion engine is necessary and when a heating is demanded of a heater that heats a vehicle room through the use of the internal combustion engine as a heat source; and an intermittent prohibition control module configured to control the internal combustion engine so as to autonomously operate at a first autonomous rotational speed when the fuel consumption priority mode selection switch is turned off during an intermittent operation prohibition in which the intermittent operation of the internal combustion engine is prohibited by the intermittent permission determining module and a load operation is not demanded of the internal combustion engine, the control module controlling the internal combustion engine so as to autonomously operate at a second autonomous rotational speed defined to be not more than the first autonomous rotational speed when the fuel consumption priority mode selection switch is turned on during the intermittent operation prohibition.

2. A vehicle according to claim 1, further comprising:
a motor capable of outputting power for driving; and
an accumulator capable of supplying and receiving electric power from the motor.

3. A vehicle according to claim 1, further comprising:
a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

4. A vehicle according to claim 3, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, and wherein the motor is capable of outputting power to the predetermined axle or another axle different from the predetermined axle.

5. A vehicle according to claim 4, wherein the electric power-mechanical power input output structure includes a generator capable of inputting and outputting power, and a three shaft-type power input output assembly connected with three shafts, the predetermined axle, the engine shaft of the internal combustion engine, and a rotating shaft of the generator, the three shaft-type power input output assembly configured to input and output power to one remaining shaft, based on input and output of powers from and to any two shafts selected among the three shafts.

6. A vehicle according to claim 3, wherein the power transmitting mechanism is a continuously variable transmission.

7. A control method of a vehicle including an internal combustion engine capable of outputting power for driving and performing an intermittent operation and a fuel consumption priority mode selection switch to select a fuel consumption priority mode that gives priority to fuel consumption, the method comprising the steps of:

(a) prohibiting the intermittent operation of internal combustion engine at least one of when a warm up of the internal combustion engine is necessary and when a heating is demanded of a heater that heats a vehicle room through the use of the internal combustion engine as a heat source; and (b) controlling the internal combustion engine so as to autonomously operate at a first autonomous rotational speed when the fuel consumption priority mode selection switch is turned off during an intermittent operation prohibition in which the intermittent operation of the internal combustion engine is prohibited at the step (a) and a load operation is not demanded of the internal combustion engine, the step (b) controlling the internal combustion engine so as to autonomously operate at a second autonomous rotational speed defined to be not more than the first autonomous rotational speed when the fuel consumption priority mode selection switch is turned on during the intermittent operation prohibition.

* * * * *